United States Patent [19]
Dockner et al.

[11] 3,928,439
[45] Dec. 23, 1975

[54] MANUFACTURE OF CARBOXAMIDES

[75] Inventors: Toni Dockner, Meckenheim; Rolf Platz, Mannheim, both of Germany

[73] Assignee: BASF Aktiengesellschaft, Ludwigshafen (Rhine), Germany

[22] Filed: Apr. 10, 1974

[21] Appl. No.: 459,458

[30] Foreign Application Priority Data
Apr. 19, 1973 Germany............................ 2320060

[52] U.S. Cl............ 260/557 R; 260/561 R; 252/457
[51] Int. Cl.²........................................ C07C 103/00
[58] Field of Search...... 252/457; 260/561 R, 557 R

[56] References Cited
UNITED STATES PATENTS 1,738,971  12/1929  Storch............................ 252/457 X
3,631,104  12/1971  Habermann et al. ........ 260/561 R X
3,642,643   2/1972  Habermann................. 260/561 R X
3,642,894   2/1972  Habermann et al. ........ 260/561 R X Primary Examiner—Allen B. Curtis
Attorney, Agent, or Firm—Johnston, Keil, Thompson & Shurtleff

[57] ABSTRACT

Manufacture of carboxamides by the addition of water to nitriles in the presence of a copper-containing and magnesium silicate-containing catalyst which has been treated with a reducing gas. The carboxamides obtained by the process of the invention are valuable starting materials for the manufacture of solvents, flocculating agents, crosslinking agents, pesticides, plant protectants, textile auxiliaries such as levelling agents, waterproofing agents, foam stabilizers and detergents.

11 Claims, No Drawings

MANUFACTURE OF CARBOXAMIDES

This application discloses and claims subject matter described in German Patent Application P 23 20 060.4, filed Apr. 19, 1973, which is incorporated herein by reference.

This invention relates to a process for the manufacture of carboxamides by the addition of water to nitriles in the presence of a catalyst which contains copper and magnesium silicate and which has been treated with a reducing gas.

U.S. Pat. No. 3,381,034 discloses that carboxamides may be manufactured from nitriles by water addition in the presence of copper (II) and copper (I) salts. It is stated that elementary copper may also be used if desired. The yield of end product is unsatisfactory.

German Published Application 2,001,903 teaches that the catalyst used for this reaction may be a reduced copper oxide, reduced copperchromic oxide or reduced coppermolybolic oxide or mixtures thereof. The catalysts described in the Examples show inadequate selectivity in the industrially important process of adding water to acrylonitrile and methacrylonitrile. Example 3 shows that at the commencement of the reaction the yield and conversion are only about 50%, 30% of the reacted nitrile being in the form of β-hydroxypropionitrile. Only after a relatively long reaction time does the conversion rise to 90% and above. On the other hand, Example 7 shows that the activity of the reduced oxide decreases after 1,400 hours, after which time a yield of 90% of theory is achieved. Not even the presence of stabilizing agents in the form of barium, as described in Example 5, produces satisfactory results, since the conversion is 73% and falls to 43%, whilst the initial yield is 59%, this rising to 84% during the course of the reaction. Furthermore, the byproducts, which occur in considerable amounts in some cases, are impossible or difficult to separate.

German Published Application 2,036,126 describes a process for the manufacture of an amide in which water is added catalytically to a nitrile such as acrylonitrile or methacrylonitrile. Catalysts mentioned are metal-containing catalysts such as Raney copper, Ullmann copper, reduced copper catalysts, supported copper, and also silver, gold, cobalt, palladium and platinum. The copper catalysts mentioned in Examples 1 to 10, such as Raney copper, reduced copper oxide, Ullmann copper and copper-on-asbestos, provide dilute acrylamide solutions at very low conversions. The active life of the catalysts is not stated. When the comparatively expensive Raney copper catalysts, which have a complicated synthesis, are used, the process is unsatisfactory as regards economy, simplicity of operation and handling of the catalyst. Raney copper has only a short life and regeneration of such catalysts is complicated. On the other hand, German Published Application 2,164,186 discloses that all of these copper catalysts rapidly lose activity and must be regenerated with hydrogen at elevated temperature.

It is an object of the invention to provide a novel process for the manufacture of a large number of carboxamides in a simpler and more economical manner, in good yield and purity and with better space-time yields based on the total amount of copper in the catalyst, and with longer on-stream periods.

We have now found that carboxamides may be advantageously obtained by the addition of water to nitriles in the presence of a copper-containing catalyst, if the reaction is carried out using a catalyst which contains copper and a magnesium silicate which has been manufactured by precipitation of a magnesium compound with an alkali metal silicate in the presence of a copper compound, which catalyst has been treated with a reducing gas at elevated temperature.

The reaction may be represented by the following equation illustrating the use of acrylonitrile:

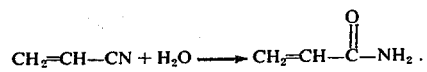

Compared with prior processes, the process of the invention produces a large number of carboxamides in a simpler and more economical manner and in good yield and purity with better space-time yields, based on the total amount of copper in the catalyst, and with longer on-stream periods. The product is usually sufficiently pure to be used directly without further purification. Complicated purifying operations are thus avoided. The high selectivity of the catalyst together with its long life permit longer on-stream periods, particularly in large-scale work, and avoid the necessity for frequent regeneration of the catalyst. Furthermore, the catalyst may be regenerated in a simpler and quicker manner. Use is not made of expensive metals which are not readily available.

Suitable starting materials are aliphatic, cycloaliphatic, araliphatic and aromatic mono-, di- and polynitriles. Preferred starting materials are those of the formula

I and, accordingly, preferred products are those of the formula

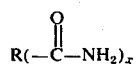

II, in which x denotes 2 or, more particularly, 1 and R denotes alkyl(ene) of from 1 to 6 carbon atoms, alkenyl(ene) of from 2 to 6 carbon atoms, cycloalkyl(ene) of 5 or 6 carbon atoms, aralkyl(ene) of from 7 to 12 carbon atoms, phenyl(ene) or naphthyl(ene) (the suffix "ene" given in parentheses referring to the case when x is 2). The above radicals may be substituted by groups which are inert under the conditions of the reaction, for example by alkyl or alkoxy groups of from 1 to 4 carbon atoms.

Specific examples of starting materials are: acetonitrile, propionitrile, cyclohexanonitrile, adipodinitrile, acrylonitrile, methacrylonitrile, crotononitrile, β-phenylacrylonitrile, benzonitrile, p-toluonitrile, α-napthonitrile, phthalodinitrile, terephthalodinitrile, isophthalodinitrile, butyronitrile, maleodinitrile, glutarodinitrile, succinodinitrile, valeronitrile, capronitrile, fumarodinitrile, β-phenylacetonitrile and p-ethoxybenzonitrile.

The starting material is reacted with water either in its stoichiometric amount or in excess, advantageously in a ratio of from 1 to 50 moles of water per mole and nitrile group of the starting material. The reaction is usually carried out at a temperature of from 50° to 150°C and preferably at from 60° to 110°C, at atmospheric or superatmospheric pressure, continuously or batchwise.

The catalyst contains substantially non-ionized copper which is either added as such, e.g., in the form of freshly reduced copper, to the magnesium silicate prior to the treatment with reducing gases (reductive treatment) or, more conveniently, is formed from copper compounds during such treatment. Advantageously, the copper is derived from copper compounds which are present during precipitation of the magnesium silicate and which are converted to the non-ionized form by the reductive treatment. The treated catalyst may contain, in addition to the bulk of non-ionized copper, advantageously from 0.1 to 30% and in particular from 0.1 to 10%, by weight of the total weight of copper, of monovalent and divalent copper, e.g., in the form of the copper compound originally present or a compound formed during said treatment, for example copper silicate. In general, suitable total amounts of copper in the catalyst are from 50 to 100% and in particular from 70 to 80%, by weight of the weight of magnesium silicate contained in the catalyst, and the amount of starting material for each gram-atom of magnesium contained in the catalyst is from 0.5 to 2 moles and in particular from 1 to 1.5 moles Suitable copper compounds are for example the nitrate, sulfate, chloride, oxide, hydroxide, tartrate, acetate, oxalate, cyanide, cuprites such as sodium cuprite, the bromide, iodide, nitrite, or carbonate of monovalent or, conveniently, divalent copper.

The magnesium silicate is produced in the presence of a copper compound, conveniently the copper compound giving the non-ionized copper, by precipitation of a magnesium compound with an alkali metal silicate, advantageously a potassium or sodium silicate, usually in an aqueous mother liquor and advantageously in a ratio of from 1 to 5 moles of alkali metal silicate per mole of magnesium compound. Suitable magnesium compounds are magnesium nitrate, sulfate, chloride, tartrate, acetate, oxalate, bromide, iodide and nitrite. Precipitation is advantageously carried out at from 15° to 50°C. Some of the copper compound may be suspended in the mother liquor.

The catalyst may contain small amounts of zinc, cadmium, chromium, molybdenum, tungsten, vanadium, uranium, titanium and/or thorium in the form of the metals themselves or, conveniently, in the form of appropriate compounds. The amount of such ingredients is advantageously from 1 to 30% and preferably from 1 to 10% by weight of additional metal, based on the weight of the magnesium contained in the catalyst. Convenient compounds are the nitrates, sulfates, chlorides, tartrates, acetates, oxalates, bromides, iodides and nitrites of the aforementioned metals. Usually, these compounds will be present in the medium in which the magnesium compound is to be precipitated.

In the preferred embodiment, catalysts are used which have been obtained by precipitating a magnesium compound in the presence of a copper compound and possibly one or more compounds of said additional metals in aqueous medium by the catalyst manufacturing method described in German Pat. No. 869,052. In some cases it is advantageous to knead the precipitated composition, after washing and drying, with a not too large amount of alkali metal silicate solution, conveniently from 5 to 20% by weight of a 10 to 30% w/w sodium or potassium silicate solution, based on the precipitated composition, and, after redrying, to shape the composition at as low a temperature as possible, for example at from 15° to 30°C. The addition of too much alkali metal silicate might cause undesirable side reactions, for which reason it is often advantageous to treat the catalysts for only a brief period with dilute waterglass solution or the like after shaping has been carried out.

Advantageously, from 10 to 50% w/w aqueous solutions of said copper, magnesium and, if used, additional metal compounds and from 10 to 30% w/w aqueous solutions of alkali metal silicate are mixed together at the aforementioned precipitating temperature, precipitation being carried out for from 1 to 60 minutes. The precipitate is then filtered off, washed with water, for example until the original copper anion such as the nitrate anion is completely removed, predried at from 20° to 30°C, shaped to, say, tablets, spheres or pellets and then dried at from 50° to 70°C.

The resulting catalyst is treated with reducing gases at an elevated temperature, conveniently at temperatures of from 100° to 230°C and preferably from 180° to 230°C, at atmospheric or superatmospheric pressure, continuously or batchwise. The reducing gas is usually hydrogen. However, other reducing gases are suitable, for example carbon monoxide, olefins, e.g., ethylene, and propylene, or gas mixtures or nonpurified gaseous compounds (technical gases) containing reducing gases such as hydrogen and carbon monoxide, for example combustible gases such as illuminating gas, producer gases, low-temperature carbonization coal gases, coal gas, blast furnace gas, low-temperature carbonization producer gases, water gases, oil-gas, coke-oven gas, town gases, synthesis gases, technical propane and technical butane. The treatment time is advantageously from 1 to 15 hours. Advantageously, the catalyst, after manufacture and drying thereof, is first held under a blanket of nitrogen, preferably in the form of a stream of nitrogen, at elevated temperature, preferably a temperature of from 100° to ½°C and more preferably from 120° to 140°C, advantageously for from 1.5 to 3 hours. This is followed by the reductive treatment, which is preferably carried out over a period of from 1.5 to 24 hours using from 5 to 15 moles of hydrogen or an equivalent of reducing gas per kilogram of catalyst, In a preferred embodiment, the stream of nitrogen in the pretreatment step is gradually replaced by increasing amounts of hydrogen with simultaneous increase in the temperature until the treatment temperature is reached, whilst the amount of nitrogen is reduced accordingly such that after, say, from 6 to 20 hours the stream of pure nitrogen has become a stream of gas containing only the reducing gas and only that amount of nitrogen which is normally present in such reducing gas.

The reaction may be carried out as follows. The starting nitrile, water and catalyst obtained and reduced in the above manner are held at the reaction temperature for from 1 to 4 hours. The product is then separated from the reaction mixture in conventional manner, for example by filtration, concentration of the filtrate and renewed filtration.

The carboxamides obtained in the process of the invention are valuable starting materials for the manufacture of solvents, flocculating agents, crosslinking agents, pesticides, plant protectants and textile auxiliaries such as levelling agents, waterproofing agents, foam stabilizers and detergents. Amides of higher fatty acids are surfactants and levelling agents. Unsaturated carboxamides, for example acrylamide and methacrylamide, are well-known monomers for the synthesis of plastics. For information on the use of these products, see the above references and also Ullmann's Encyklopaedie der technischen Chemie, Vol. 14, pages 287 et seq. and Supplement, page 136.

In the following Examples the parts are by weight, unless otherwise stated. The parts by weight relate to the parts by volume as do kilograms to liters.

EXAMPLES

Preparation of catalyst

Aqueous 20% w/w solutions of 160 parts of copper nitrate, 100 parts of magnesium nitrate and 8 parts of chromium nitrate respectively are mixed together and an aqueous 15% w/w solution of 220 parts potassium silicate is added at 20°C. The suspension formed is filtered and the filter cake is washed with water until the washings contain no further nitrate anions. The filter cake is predried for 5 hours at 40°C, shaped into tablets and dried at 60°C for 5 hours. The reductive treatment is started by heating the filter cake in a stream of nitrogen for 60 minutes at 130°C. Hydrogen is then added to the nitrogen in increasing amounts. After 2 hours, all of the nitrogen has been replaced by hydrogen and the temperature has been raised to 220°C. The catalyst is then maintained at 220°C in the stream of pure hydrogen for a further 3 hours and then cooled. The catalyst thus obtained (1,000 parts) and containing 300 parts of total copper, is used in the following Examples.

EXAMPLE 1

In a stirred apparatus, 800 parts of water and 212 parts of acrylonitrile are added to 100 parts of catalyst. The mixture is held at 70°C for 4 hours with stirring. Following filtration of the catalyst, the filtration is concentrated to give 205 parts of solid substance (99.7% of theory, based on nitrile converted). This solid material consists of pure acrylamide, as demonstrated by analysis using thin-layer and gas chromatographic methods. Conversion is 72% and the spacetime yield is 1.7 parts of acrylamide per part of total copper per hour.

EXAMPLE 2

In a manner similar to that described in Example 1, a mixture of 268 parts of methacrylonitrile and 800 parts of water is reacted for 4 hours at 75°C. Following filtration of the catalyst and evaporation of the solution there are obtained 142 parts (99.1% of theory on nitrile converted) of a solid material, which is found to consist of pure methacrylamide on analysis using thin-layer and gas chromatographic methods. Conversion is 41% and the space-time yield is 1.18 parts of methacrylamide per part of total copper per hour.

EXAMPLE 3

In a manner similar to that described in Example 1, 516 parts of benzonitrile and 2,000 parts of water are reacted at 100°C for 5 hours. The catalyst is filtered off from the hot solution to give 140 parts (99.5% of theory on nitrile converted) of pure benzamide. This is equivalent to a conversion of 23.1% and a space-time yield of 0.933 part of benzamide per part of total copper per hour.

EXAMPLE 4

In a manner similar to that described in Example 1, 216 parts of adipodinitrile are reacted with 800 parts of water at 95°C for 6 hours. The solution is then separated from the catalyst whilst still hot and is evaporated. There are obtained 233 parts (99% of theory on nitrile converted) of pure adipodiamide, equivalent to a conversion of 81% and a spacetime yield of 1.29 parts of diamide per part of total copper per hour.

EXAMPLE 5

In a manner similar to that described in Example 1, 410 parts of acetonitrile are reacted with 2,000 parts of water at from 80° to 85°C for 5 hours with stirring. After separation of the catalyst there is obtained a solution which is evaporated to give 288 parts (99.5% of theory on nitrile converted) of pure acetamide. The conversion is 49% and the space-time yield is 1.920 parts of amide per part of total copper per hour.

EXAMPLE 6

Catalytic water-addition is carried out continuously in a tubular reactor. The reactor has a length of 2 m and a diameter of 50 mm and is packed with 2,000 parts of catalyst. 3,000 parts/hr of oxygen-free acrylonitrile and 500 parts/hr of oxygen-free water are metered to the reactor. At the same time, the liquid phase is recycled with the exclusion of oxygen in a ratio of 50:1, based on the feed. The reaction temperature is maintained at 70°C. The liquid reaction mixture is passed through a separator, cooler and a second separator. The product consists of two phases. The upper phase is obtained at a rate of 125 parts/hr and consists of 86.7% of unreacted acrylonitrile, 6.6% of acrylamide and 6.7% of water, by weight. The lower phase is obtained at a rate of 675 parts/hr and consists, over an on-stream time of 2,000 hours, of 23.7% of acrylamide (more than 99% of theory on nitrile converted), 9.8% of acrylonitrile and 66.5% of water containing 0.050% of impurities (including 0.002% of copper), by weight. Conversion is 42% and the space-time yield is 0.28 parts of acrylamide per part of total copper per hour.

EXAMPLE 7

In a manner similar to that described in Example 6 using a tubular reactor but omitting recycling, 200 parts/hr of acrylonitrile and 1,200 parts/hr of water are reacted at 70°C. The product is obtained at a rate of 1,400 parts/hr and consists of a single phase comprising 16% of acrylamide (more than 99% of theory on nitrile converted), 4.7% of acrylonitrile, 79.3% of water containing 0.04% of impurities (including 0.0015% of copper), by weight, after an on-stream time of 3,000 hours. Conversion is 72% and the space-time yield is 0.320 part of acrylamide per part of total copper per hour.

We claim:

1. A process for the manufacture of carboxamides by the addition of water to nitrile in the presence of a copper-containing catalyst, wherein the reaction is carried out using a catalyst which contains copper and a magnesium silicate which has been manufactured by precipitation of a magnesium compund with an alkali metal silicate in an aqueous mother liquor in a ratio of 1 to 5 moles of alkali metal silicate per mole of magnesium compound at a temperature of from 15° to 50°C and in the presence of a copper compound, which catalyst has been treated with a reducing gas at elevated temperature to reduce the copper compound to mainly non-ionized copper and 0.1 to 30%, based on the total copper content of the catalyst, of a compound of monovalent or divalent copper.

2. A process as claimed in claim 1, wherein the reaction is carried out using starting materials of the formula:

R(—CN)$_x$ where $x$ denotes 2 or, more particularly, 1 and R denotes alkyl(ene) of from 1 to 6 carbon atoms, alkenyl(ene) of from 2 to 6 carbon atoms, cycloalkyl(ene) of 5 or 6 carbon atoms, aralkyl(ene) of from 7 to 12 carbon atoms, phenyl(ene) or naphthyl(ene), which radicals may be substituted by groups which are inert under the conditions of the reaction.

3. A process as claimed in claim 1, wherein the reaction is carried out with water in a ratio of from 1 to 50 moles of water per mole and nitrile group of the starting material.

4. A process as claimed in claim 1, wherein the reaction is carried out at a temperature of from 50° to 150°C.

5. A process as claimed in claim 1, wherein the reaction is carried out at a temperature of from 60° to 110°C.

6. A process as claimed in claim 1, wherein the reaction is carried out using an amount of total copper of from 50 to 100% by weight, based on the weight of magnesium silicate present in the catalyst, and with from 0.5 to 2 moles of starting nitrile, based on the gram-atom of magnesium contained in the catalyst.

7. A process as claimed in claim 1 wherein the amount of total copper in the catalyst is 50 to 100% by weight, based on the weight of magnesium silicate in the catalyst.

8. A process as claimed in claim 1, wherein the reaction is carried out using a catalyst which also contains additional metal in an amount of from 1 to 30% by weight of the weight of magnesium contained in the catalyst.

9. A process as claimed in claim 1, wherein the reaction is carried out using a catalyst in the preparation of which 10 to 50% w/w aqueous solutions of said copper, magnesium and, if used, additional metal compounds and from 10 to 30% w/w aqueous solutions of alkali metal silicate are mixed at the said precipitating temperature, whereupon precipitation is carried out for from 1 to 60 minutes followed by filtering of the precipitate, which is then washed with water, predried at from 20° to 30°C, shaped and finally dried at from 50° to 70°C.

10. A process as claimed in claim 1, wherein the reaction is carried out using a catalyst which has been treated with reducing gases at from 100° to 230°C and was maintained under a blanket of nitrogen at from 100° to 180°C after manufacturing and drying and prior to said treatment with reducing gases.

11. A process as claimed in claim 1, wherein the reaction is carried out using a catalyst which has been reduced with from 5 to 15 moles of hydrogen or an equivalent of reducing gas per kilogram of catalyst.

* * * * *

UNITED STATES PATENT AND TRADEMARK OFFICE
CERTIFICATE OF CORRECTION

PATENT NO. : 3,928,439
DATED : December 23, 1975
INVENTOR(S) : Toni Dockner et al.

It is certified that error appears in the above-identified patent and that said Letters Patent are hereby corrected as shown below:

In Column 1, Line 20, delete "coppermolybolic" and substitute --coppermolybdic--

In Column 4, Line 38, delete "1/2° C." and substitute --180° C.--

In Column 5, Line 38, delete "... the filtration is ..." and substitute --... the filtrate is ...--

Signed and Sealed this

Fourteenth Day of September 1976

[SEAL]

Attest:

RUTH C. MASON
Attesting Officer

C. MARSHALL DANN
Commissioner of Patents and Trademarks